UNITED STATES PATENT OFFICE.

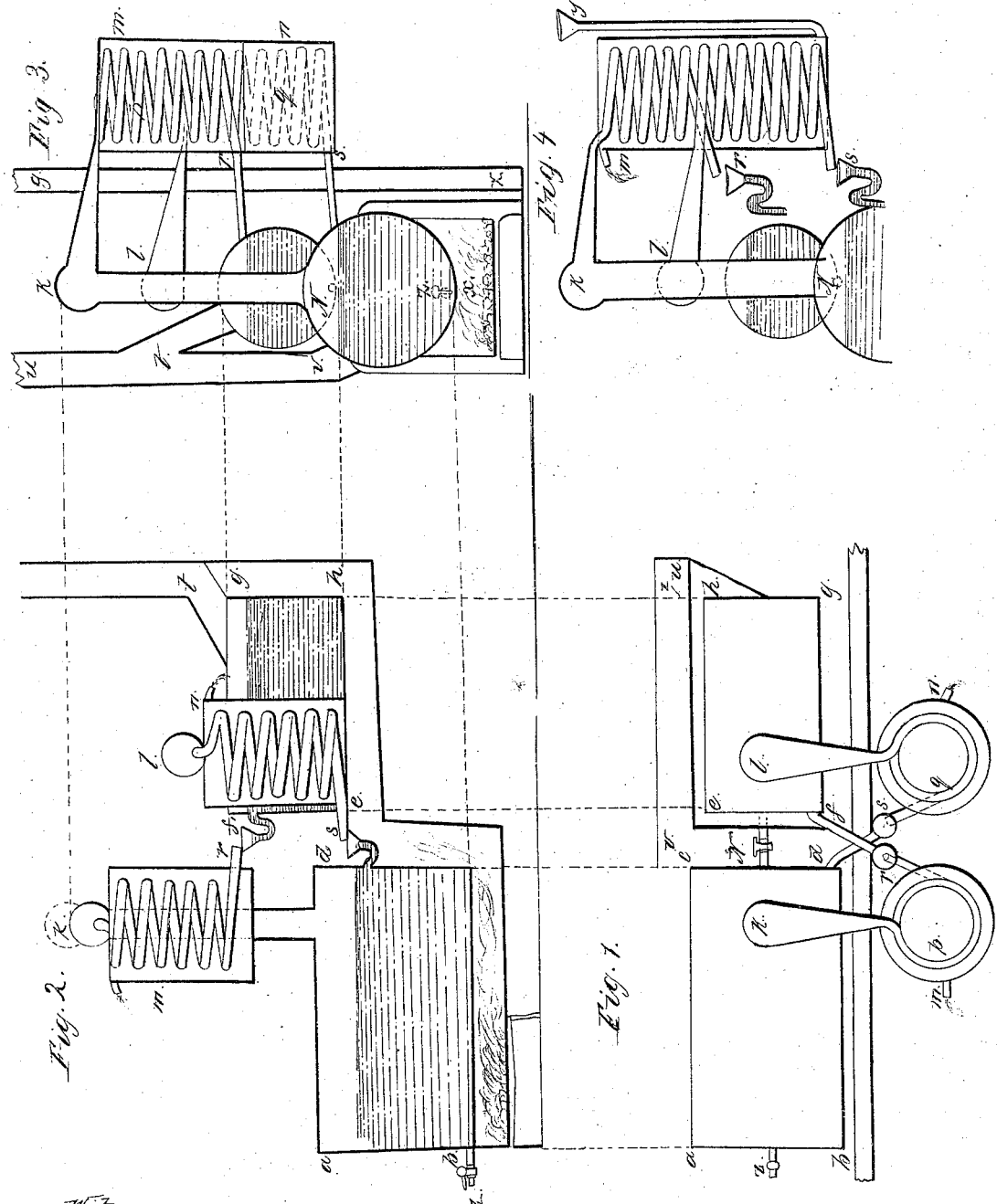

PETER H. VAN DER WEYDE, OF PHILADELPHIA, PENNSYLVANIA.

IMPROVED DOUBLE STILL FOR PETROLEUM.

Specification forming part of Letters Patent No. 58,512, dated October 2, 1866; antedated September 21, 1866.

*To all whom it may concern:*

Be it known that I, PETER HENDRICH VAN DER WEYDE, of the city and county of Philadelphia, State of Pennsylvania, have invented an Improved Double Still for Petroleum, the object of which is to avoid the defects and overcome the objections of other double stills.

These defects and objections to which other double stills for which patents have been granted are subjected to are chiefly caused by the system of placing a smaller second still inside a larger one, and, consequently, first, to contain a certain amount, the volume of the outer still must be made so much larger than the place occupied by the inner one, requiring greater expense, larger furnace, and more fuel; second, the rapidity of any distillation depends for a great deal on the amount of evaporating-surface of the liquid in the still, and this is greatly diminished by the introduction of an interior still reaching the oil, thus being an impediment to its rapid evaporation; third, by running the cooled products of the distillation of the outer still in the inner the temperature of the outer still is so reduced by the contact of a cold liquid in its center that the whole distillation is sometimes checked, producing a great loss of time; fourth, it is impossible to draw the contents of the second still or to run them back into the first still without distilling them again to get them out; fifth, it is impossible to regulate the heat of the inner still at the option of the operator—it will always be hot, even when empty, and its temperature will always be very near to that of the outer still; sixth, by running the vapors up in a long vertical tube to reach the highly-elevated condenser a great portion of this vapor is condensed before reaching the condenser, and runs continually back along the sides of this tube in the still; seventh, this vertical narrow tube being exposed to the cold air, and also being so near to the still, is very apt to receive deposits of solid paraffine toward the end of the distillation, which may choke up this tube and cause an explosion of the still.

The first, second, and third difficulties I have overcome by simply placing the second smaller still outside of the first on the flue, thus economizing heat, and giving the second still a sufficient amount, but always a little less than that received by the first still.

The fourth objection I overcome by placing the second still so much higher than the first that its bottom is equal with the surface of the oil in the first still when filled, connecting them with tube and stop-cocks.

The fifth objection I overcome by making proper valves in the flue by which to regulate the heat, and even to shut it off entirely when the second still is empty.

The sixth objection I overcome by placing the condensers as low as practicable—namely, the bottom of the first condenser only about four inches above the surface the oil has to reach in the second still, and the bottom of the second condenser about four inches above the level of the surface of the oil in the first still when filled.

The seventh objection I overcome by substituting for the long vertical tube a short wide goose-neck with dome attached well protected for cooling influences by a felt covering and connected by means of a slightly-descending tube with the condensing-worm.

The following is an exact description of the apparatus, which will enable others following this business to make and use it.

Figure 1 is a horizontal section. Fig. 2 is a vertical section. Fig. 3 is a front view.

$a\ b\ c\ d$ is the first largest still, situated over the furnace, and $k$ its dome for the exit of vapors. $e\ f\ g\ h$ is the second smaller still, situated over a part of the flue, and $t\ u$ and $l$ its dome for the exit of vapors. $p$ is the condenser of the vapors proceeding from the first still. They enter by $k$, and the condensed liquid is discharged by $r$ and drawn off or run in the second still $e\ f\ g\ h$, if required. $q$ is the condenser of the vapors proceeding from the second still. They enter by $l$, and the condensed liquid is discharged by $e$ and drawn off or run back in the first still, if required.

X Y is a brick wall separating the fire-room from the condensers and all places where the oil may be exposed to the air. N is the connecting-pipe and stop-cock between the two stills. P is the feed-pipe for the first still to fill it with fresh crude petroleum. Z is the stop-cock to draw off the tar at the end of the operation.

By this arrangement I gain all the advantages claimed by this double still, and more even, overcome all its difficulties and drawbacks, and economize labor, expense, and fuel. I may distill and return the lighter oils continually to the first still, and thus reduce their specific gravity to that of the kerosene, and draw it off only when found satisfactory. I may draw fluid from the body of the second still, or from its condenser, or from the first condenser, three different places giving me oils of three different specific gravities.

As the condensing-worm of the second still is lower than that of the first, and also requires colder water, both worms may be placed, one above the other, in a single vessel, receiving, as usual, the supply of cold water from below, and discharging the hot water from the top. Fig. 4 represents such an arrangement.

What I claim as my invention, and wish to secure by Letters Patent, is—

A double still in which all the defects and objections against other double stills are corrected in the manner described.

Philadelphia, November 4, 1865.

P. H. VAN DER WEYDE, M. D.

Witnesses:
 WM. ROBINSON,
 A. L. FLEURY.